(12) United States Patent
Arai

(10) Patent No.: US 11,897,465 B2
(45) Date of Patent: Feb. 13, 2024

(54) VEHICLE CONTROL DEVICE

(71) Applicant: SUBARU CORPORATION, Tokyo (JP)

(72) Inventor: Shoto Arai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 40 days.

(21) Appl. No.: 17/081,792

(22) Filed: Oct. 27, 2020

(65) Prior Publication Data
US 2021/0245746 A1 Aug. 12, 2021

(30) Foreign Application Priority Data

Feb. 12, 2020 (JP) .................. 2020-021170

(51) Int. Cl.
*B60W 30/14* (2006.01)
*B60K 17/356* (2006.01)

(52) U.S. Cl.
CPC ......... *B60W 30/143* (2013.01); *B60K 17/356* (2013.01); *B60W 2552/15* (2020.02); *B60W 2710/083* (2013.01); *B60W 2720/10* (2013.01)

(58) Field of Classification Search
CPC .................................................. B60W 30/143
See application file for complete search history.

(56) References Cited

U.S. PATENT DOCUMENTS

| 2010/0023236 | A1* | 1/2010 | Morgan | ................. | B60K 31/00 |
| | | | | | 701/71 |
| 2017/0291605 | A1* | 10/2017 | Grewal | ............... | B60W 30/188 |
| 2018/0134291 | A1* | 5/2018 | Burford | ................. | B60K 31/00 |
| 2021/0129838 | A1* | 5/2021 | Hultén | ................. | B62D 15/025 |

FOREIGN PATENT DOCUMENTS

| JP | 2002-089314 A | 3/2002 |
| JP | 2008-074254 A | 4/2008 |
| JP | 2008-221935 A | 9/2008 |

OTHER PUBLICATIONS

Japanese Office Action dated Aug. 29, 2023 in corresponding Japanese Patent Application No. 2020-021170, and English translation thereof.

* cited by examiner

*Primary Examiner* — Imran K Mustafa
(74) *Attorney, Agent, or Firm* — MCGINN I.P. LAW GROUP, PLLC

(57) ABSTRACT

A vehicle control device includes a controller configured to control operation of a driving motor that is to output a driving force for a vehicle. The controller is switchable between a normal mode of controlling acceleration/deceleration based on a driver's acceleration/deceleration operation, and a cruise control mode of maintaining the vehicle speed at a target speed without the acceleration/deceleration operation. The controller is configured to, during the cruise control mode, calculate a torque command value for the motor by using integral control based on an integrated value of a deviation between the vehicle speed and the target speed, and execute an integrated-value adjustment process if the controller determines that the vehicle entered a flat road or an uphill road from a downhill road or a downhill road from a flat road or an uphill road. The process adjusts the integrated value to reduce an absolute value of the integrated value.

20 Claims, 3 Drawing Sheets

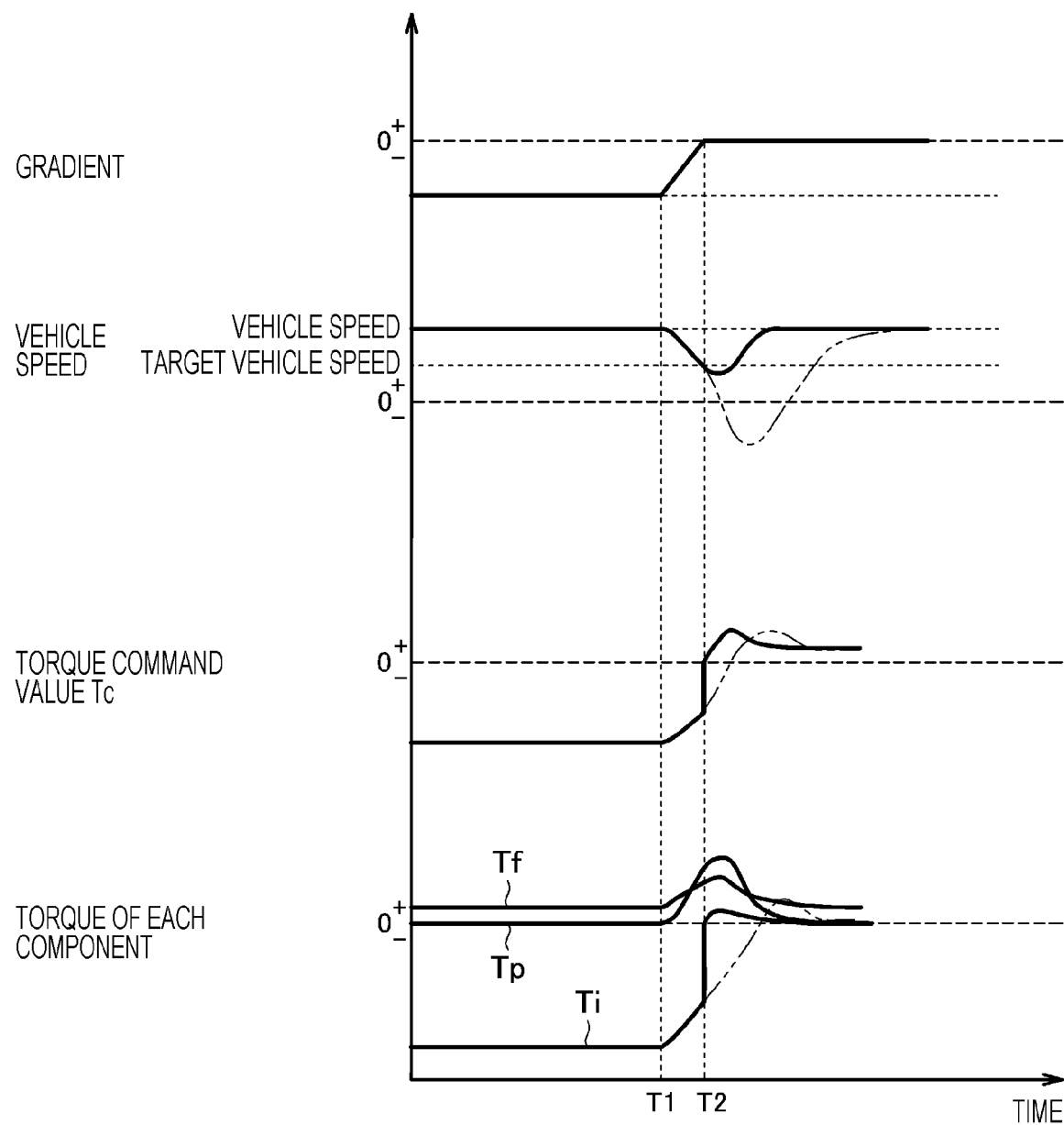

VEHICLE CONTROL DEVICE

CROSS-REFERENCE TO RELATED APPLICATIONS

The present application claims priority from Japanese Patent Application No. 2020-021170 filed on Feb. 12, 2020, the entire contents of which are hereby incorporated by reference.

BACKGROUND

The disclosure relates to vehicle control devices.

Japanese Unexamined Patent Application Publication No. 2008-221935 describes an example of a vehicle capable of executing, in addition to a normal mode, a cruise control mode for the purpose of assisting with a driver in driving operation. In the normal mode, the acceleration and deceleration of the vehicle are controlled in accordance with an acceleration-and-deceleration operation (i.e., controlling of the accelerator pedal and the brake pedal) by the driver. In the cruise control mode, the vehicle speed is maintained at a target vehicle speed without being dependent on the acceleration-and-deceleration operation by the driver.

SUMMARY

An aspect of the disclosure provides a vehicle control device including a controller. The controller is configured to control operation of a driving motor that is to output a driving force for a vehicle. The controller is capable of executing a normal mode and a cruise control mode that are switchable. The normal mode is a mode in which acceleration and deceleration of the vehicle are controlled in accordance with an acceleration-and-deceleration operation by a driver. The cruise control mode is a mode in which a vehicle speed of the vehicle is maintained at a target vehicle speed by controlling torque of the driving motor without being dependent on the acceleration-and-deceleration operation by the driver. During the cruise control mode, the controller is configured to calculate a torque command value for the driving motor by using integral control based on an integrated value of a deviation between the vehicle speed and the target vehicle speed, and execute an integrated-value adjustment process if the controller determines that the vehicle has entered either one of a flat road and an uphill road from a downhill road or that the vehicle has entered a downhill road from either one of a flat road and an uphill road. The integrated-value adjustment process includes adjusting the integrated value of the deviation so as to reduce an absolute value of the integrated value of the deviation in the integral control.

An aspect of the disclosure provides a vehicle control device including circuitry. The circuitry is configured to control operation of a driving motor that is to output a driving force for a vehicle. The circuitry is capable of executing a normal mode and a cruise control mode that are switchable. The normal mode is a mode in which acceleration and deceleration of the vehicle are controlled in accordance with an acceleration-and-deceleration operation by a driver. The cruise control mode is a mode in which a vehicle speed of the vehicle is maintained at a target vehicle speed by controlling torque of the driving motor without being dependent on the acceleration-and-deceleration operation by the driver. During the cruise control mode, the circuitry is configured to calculate a torque command value for the driving motor by using integral control based on an integrated value of a deviation between the vehicle speed and the target vehicle speed, and execute an integrated-value adjustment process if the circuitry determines that the vehicle has entered either one of a flat road and an uphill road from a downhill road or that the vehicle has entered a downhill road from either one of a flat road and an uphill road. The integrated-value adjustment process includes adjusting the integrated value of the deviation so as to reduce an absolute value of the integrated value of the deviation in the integral control.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

FIG. 4 illustrates an example of transition of various types of state quantities in a case where the vehicle according to the embodiment of the disclosure enters a flat road from a downhill road during the low-speed cruise control mode.

DETAILED DESCRIPTION

Figure 1:
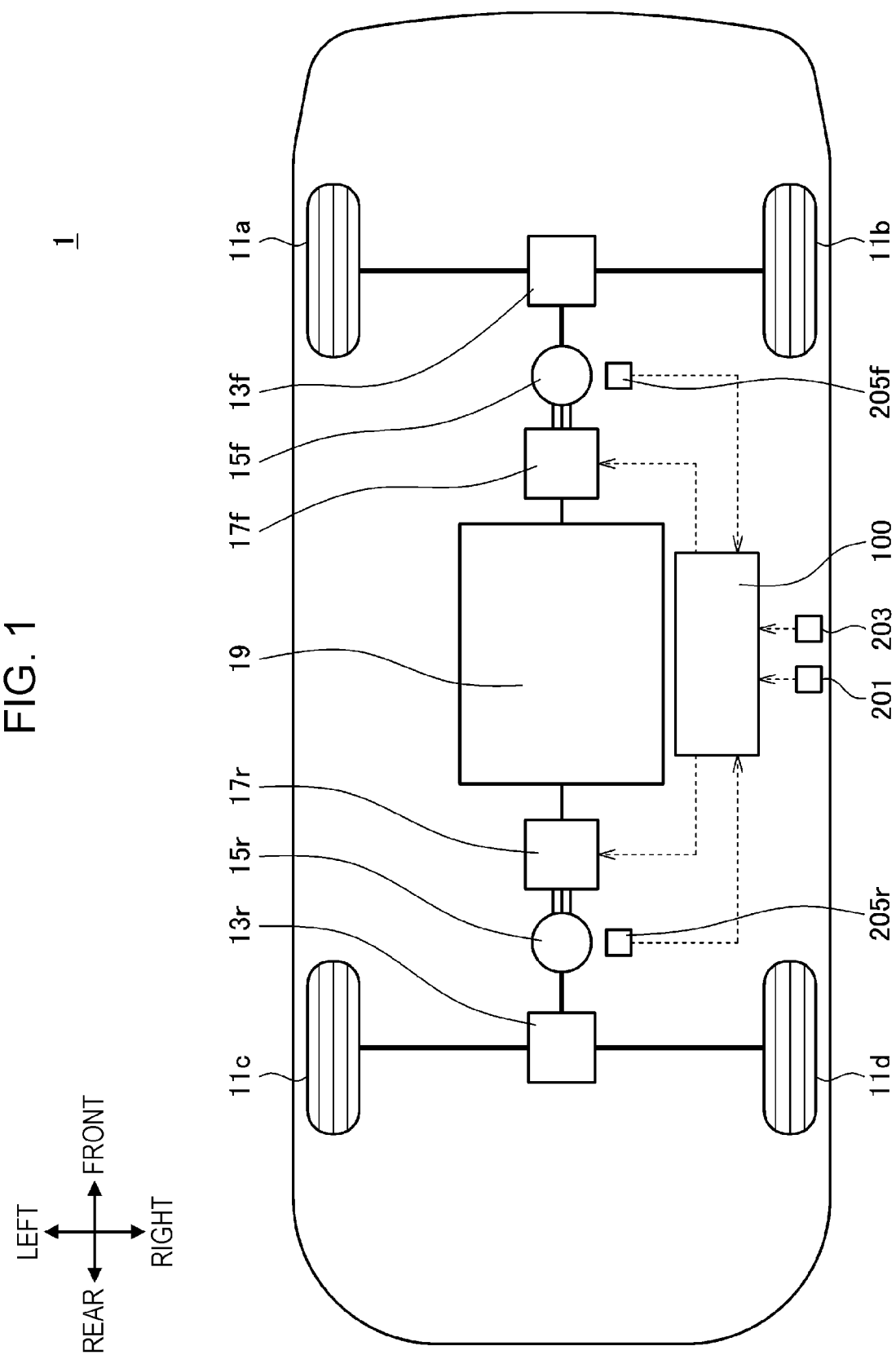
FIG. 1 schematically illustrates the configuration of a vehicle equipped with a control device according to an embodiment of the disclosure.

In a vehicle equipped with a driving motor as a driving source, torque of the driving motor is controlled in the cruise control mode so that the vehicle speed is maintained at the target vehicle speed. In the cruise control mode, the direction of the torque used for causing the vehicle to travel at the target vehicle speed varies depending on the gradient of the road. In detail, when the vehicle is traveling on either one of a flat road and an uphill road, the torque is applied in the advancing direction of the vehicle for applying a driving force to the vehicle.

On the other hand, when the vehicle is traveling on a downhill road, the torque is applied in the reverse direction of the vehicle for applying a braking force to the vehicle. Thus, when the gradient of the road changes, the direction of the torque used for causing the vehicle to travel at the target vehicle speed may be inverted.

During the cruise control mode, the torque of the driving motor may be controlled in accordance with feedback control, such as proportional-integral-derivative (PID) control. In this case, a torque command value for the driving motor includes the torque of an integral-control component based on an integrated value of a deviation between the vehicle speed and the target vehicle speed. The torque of the integral-control component changes slowly, as compared with the torques of other components, and thus causes the responsiveness, to a change in the gradient of the road, of the torque of the driving motor to deteriorate. Therefore, for example, when the vehicle enters either one of a flat road and an uphill road from a downhill road, the change in the torque of the driving motor is delayed as compared to the change in the gradient of the road, thus causing the direction of the torque occurring in the vehicle to be a reverse direction to the direction of the torque used for causing the vehicle to travel at the target vehicle speed. This may possibly cause the vehicle behavior to become unstable. In particular, it is assumed that, as the target vehicle speed in the cruise control mode decreases, the vehicle travels more on a high-gradient road and the gradient is more likely to change by a large amount. Thus, the vehicle behavior tends to become unstable due to the change in the gradient of the road.

It is desirable to provide a vehicle control device that can suppress unstable vehicle behavior caused by a change in the gradient of a road during a cruise control mode.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Vehicle Configuration

The configuration of a vehicle 1 equipped with a control device 100 according to the embodiment of the disclosure will now be described with reference to FIG. 1 and FIG. 2.

FIG. 1 schematically illustrates the configuration of the vehicle 1. The vehicle 1 is illustrated in FIG. 1 such that the advancing direction of the vehicle 1 is defined as a forward direction, the reverse direction opposite to the advancing direction is defined as a rearward direction, and the left side and the right side of the vehicle 1 when oriented in the forward direction are defined as a leftward direction and a rightward direction, respectively.

The vehicle 1 is an electric vehicle that is equipped with driving motors (i.e., a front-wheel driving motor 15f and a rear-wheel driving motor 15r in FIG. 1) as driving sources and that travels by using power output from the driving motors.

The vehicle 1 to be described below is an example of a vehicle equipped with a control device according to an embodiment of the disclosure. As will be mentioned later, the configuration of a vehicle equipped with the control device according to the embodiment of the disclosure is not particularly limited to the configuration of the vehicle 1.

As illustrated in FIG. 1, the vehicle 1 includes front wheels 11a and 11b, rear wheels 11c and 11d, a front differential device 13f, a rear differential device 13r, the front-wheel driving motor 15f, the rear-wheel driving motor 15r, an inverter 17f, an inverter 17r, a battery 19, the control device 100, an accelerator opening-degree sensor 201, a brake sensor 203, a front-wheel-motor rotation-speed sensor 205f, and a rear-wheel-motor rotation-speed sensor 205r.

The front wheel 11a, the front wheel 11b, the rear wheel 11c, and the rear wheel 11d may simply be referred to as wheels 11 if they are not to be distinguished from one another. Furthermore, the front-wheel driving motor 15f and the rear-wheel driving motor 15r may simply be referred to as driving motors 15 if they are not to be distinguished from each other. Moreover, the inverter 17f and the inverter 17r may simply be referred to as inverters 17 if they are not to be distinguished from each other. Furthermore, the front-wheel-motor rotation-speed sensor 205f and the rear-wheel-motor rotation-speed sensor 205r may simply be referred to as motor rotation-speed sensors 205 if they are not to be distinguished from each other.

The front-wheel driving motor 15f is a driving motor that outputs power for driving the front wheels 11a and 11b. The front wheel 11a corresponds to a left front wheel, and the front wheel 11b corresponds to a right front wheel.

In detail, the front-wheel driving motor 15f is driven by using electric power supplied from the battery 19. The front-wheel driving motor 15f is coupled to the front differential device 13f. The front differential device 13f is coupled to the front wheels 11a and 11b by using a driving shaft. The power output from the front-wheel driving motor 15f is transmitted to the front differential device 13f, and is subsequently transmitted distributively to the front wheels 11a and 11b by the front differential device 13f.

The front-wheel driving motor 15f is, for example, a polyphase alternating-current motor and is coupled to the battery 19 with the inverter 17f interposed therebetween. Direct-current electric power supplied from the battery 19 is converted into alternating-current electric power by the inverter 17f before being supplied to the front-wheel driving motor 15f.

In addition to outputting power for driving the front wheels 11a and 11b, the front-wheel driving motor 15f serves as an electric generator that generates electricity by using kinetic energy of the front wheels 11a and 11b. In a case where the front-wheel driving motor 15f serves as an electric generator, electricity is generated by the front-wheel driving motor 15f, and a braking force is applied to the vehicle 1 in accordance with regenerative braking. Alternating-current electric power generated by the front-wheel driving motor 15f is converted into direct-current electric power by the inverter 17f before being supplied to the battery 19, whereby the battery 19 is recharged.

The rear-wheel driving motor 15r is a driving motor that outputs power for driving the rear wheels 11c and 11d. The rear wheel 11c corresponds to a left rear wheel, and the rear wheel 11d corresponds to a right rear wheel.

In detail, the rear-wheel driving motor 15r is driven by using electric power supplied from the battery 19. The rear-wheel driving motor 15r is coupled to the rear differential device 13r. The rear differential device 13r is coupled to the rear wheels 11c and 11d by using a driving shaft. The power output from the rear-wheel driving motor 15r is transmitted to the rear differential device 13r, and is subsequently transmitted distributively to the rear wheels 11c and 11d by the rear differential device 13r.

The rear-wheel driving motor 15r is, for example, a polyphase alternating-current motor and is coupled to the battery 19 with the inverter 17r interposed therebetween. Direct-current electric power supplied from the battery 19 is converted into alternating-current electric power by the inverter 17r before being supplied to the rear-wheel driving motor 15r.

In addition to outputting power for driving the rear wheels 11c and 11d, the rear-wheel driving motor 15r serves as an electric generator that generates electricity by using kinetic energy of the rear wheels 11c and 11d. In a case where the rear-wheel driving motor 15r serves as an electric generator, electricity is generated by the rear-wheel driving motor 15r, and a braking force is applied to the vehicle 1 in accordance with regenerative braking. Alternating-current electric power generated by the rear-wheel driving motor 15r is converted into direct-current electric power by the inverter 17r before being supplied to the battery 19, whereby the battery 19 is recharged.

The accelerator opening-degree sensor 201 detects an accelerator opening degree indicating an amount by which the accelerator pedal is operated by the driver, and outputs the detection result.

The brake sensor 203 detects a brake operation amount indicating an amount by which the brake pedal is operated by the driver, and outputs the detection result.

The front-wheel-motor rotation-speed sensor 205f detects the rotation speed of the front-wheel driving motor 15f and outputs the detection result. The rear-wheel-motor rotation-speed sensor 205r detects the rotation speed of the rear-wheel driving motor 15r and outputs the detection result. The detection results of the motor rotation-speed sensors 205 are used as information indicating the rotation speed of a power transmission shaft (i.e., a shaft included in a power transmission system between the driving motors 15 and the wheels 11) of the vehicle 1 in a process performed by the control device 100.

The control device 100 includes, for example, a central processing unit (CPU) serving as an arithmetic processing unit, a read-only memory (ROM) serving as a storage element that stores programs and arithmetic parameters to be used by the CPU, and a random access memory (RAM) serving as a storage element that temporarily stores parameters that appropriately change in a process executed by the CPU.

The control device 100 communicates with each of the devices (e.g., the inverters 17, the accelerator opening-degree sensor 201, the brake sensor 203, and the motor rotation-speed sensors 205) provided in the vehicle 1. The communication between the control device 100 and each device is realized by using, for example, controller area network (CAN) communication.

Figure 2:
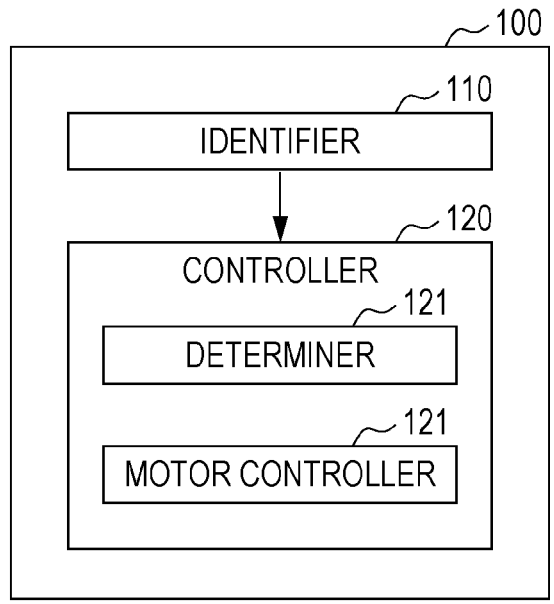
FIG. 2 is a block diagram illustrating an example of a functional configuration of the control device according to the embodiment of the disclosure.

FIG. 2 is a block diagram illustrating an example of a functional configuration of the control device 100.

For example, as illustrated in FIG. 2, the control device 100 has an identifier 110 and a controller 120.

The identifier 110 identifies the vehicle speed of the vehicle 1 (simply referred to as "vehicle speed" hereinafter) based on the rotation speed of the power transmission shaft of the vehicle 1. Information indicating the vehicle speed identified by the identifier 110 is output to the controller 120 and is used in a process performed by the controller 120.

In detail, the identifier 110 identifies the vehicle speed based on the detection results of the motor rotation-speed sensors 205. The vehicle speed may be identified by using the detection results of both the front-wheel-motor rotation-speed sensor 205f and the rear-wheel-motor rotation-speed sensor 205r or by using the detection result of one of the front-wheel-motor rotation-speed sensor 205f and the rear-wheel-motor rotation-speed sensor 205r.

Furthermore, the vehicle speed may be identified by using information (e.g., information indicating the rotation speeds of the driving shafts that couple the wheels 11 and the differential devices to each other) other than the detection results of the motor rotation-speed sensors 205 as information indicating the rotation speed of the power transmission shaft of the vehicle 1.

The controller 120 controls the operation of each device in the vehicle 1 to control the traveling of the vehicle 1. For example, the controller 120 includes a determiner 121 and a motor controller 122.

The determiner 121 performs various types of determination processes by utilizing information transmitted to the control device 100 from various devices in the vehicle 1. A determination result obtained by the determiner 121 is used in various types of processes performed by the controller 120.

The motor controller 122 controls the operation of each inverter 17 and thus controls the operation of each driving motor 15. In detail, the motor controller 122 controls the operation of a switching element of the inverter 17f and thus controls the supply of electric power between the battery 19 and the front-wheel driving motor 15f. Consequently, the motor controller 122 can control the production of power and the generation of electricity by the front-wheel driving motor 15f. Moreover, the motor controller 122 controls the operation of a switching element of the inverter 17r and thus controls the supply of electric power between the battery 19 and the rear-wheel driving motor 15r. Consequently, the motor controller 122 can control the production of power and the generation of electricity by the rear-wheel driving motor 15r.

In a case where the motor controller 122 is to drive the driving motors 15 to apply a driving force to the vehicle 1, the motor controller 122 may drive both the front-wheel driving motor 15f and the rear-wheel driving motor 15r or may drive one of the front-wheel driving motor 15f and the rear-wheel driving motor 15r.

In the case where both the front-wheel driving motor 15f and the rear-wheel driving motor 15r are to be driven, the distribution of the driving force of each driving motor 15 can be appropriately set. In the following description, the torque of the driving motors 15 refers to a total value of the torque of the front-wheel driving motor 15f and the torque of the rear-wheel driving motor 15r.

The controller 120 is capable of switching the driving mode of the vehicle 1 between a normal mode and a cruise control mode. The normal mode is a driving mode in which the acceleration and deceleration of the vehicle 1 are controlled in accordance with an acceleration-and-deceleration operation (i.e., controlling of the accelerator pedal and the brake pedal) by the driver. The cruise control mode is a driving mode in which the vehicle speed is maintained at a target vehicle speed by controlling the torque of the driving motors 15 without being dependent on the acceleration-and-deceleration operation by the driver.

Furthermore, the controller 120 is capable of switching the cruise control mode between a high-speed cruise control mode and a low-speed cruise control mode. In the low-speed cruise control mode, a target vehicle speed used is lower than a target vehicle speed in the high-speed cruise control mode. For example, the target vehicle speed in the high-speed cruise control mode is set to a speed ranging between 20 km/h and 115 km/h inclusive, whereas the target vehicle speed in the low-speed cruise control mode is set to a speed ranging between 2 km/h and 15 km/h inclusive. The target vehicle speed in the cruise control mode is adjustable in accordance with, for example, an input operation performed by the driver.

For example, the vehicle 1 is provided with an input device (e.g., either one of a switch and a button) used for selecting the driving mode from among the normal mode, the high-speed cruise control mode, and the low-speed cruise control mode. The driver can select the driving mode by operating the input device. The controller 120 executes the driving mode selected by the driver. If a specific operation, such as a braking operation, is performed by the driver during the cruise control mode, the controller 120 stops the cruise control mode and switches to the normal mode.

In the normal mode, the controller 120 controls the operation of the driving motors 15 such that the driving force applied to the vehicle 1 accords with the opening degree of the accelerator pedal. Consequently, the acceleration of the vehicle 1 can be controlled in accordance with the controlling of the accelerator pedal by the driver. Furthermore, the controller 120 controls the operation of a braking device, such as a hydraulic braking device, equipped in the vehicle 1 such that the braking force applied to the vehicle 1 accords with the brake operation amount. Consequently, the deceleration of the vehicle 1 can be controlled in accordance with the controlling of the brake pedal by the driver.

In the cruise control mode, the controller 120 calculates a torque command value for the driving motors 15 and controls the torque of the driving motors 15 to the torque command value such that the vehicle speed approaches the target vehicle speed. For example, the controller 120 uses feedforward control based on the vehicle speed and feedback control (e.g., proportional-integral-derivative (PID) control) based on a deviation between the vehicle speed and the target vehicle speed to control the torque of the driving motors 15, and calculates a torque command value as a command for the torque to the driving motors 15. In this case, for example, a torque command value Tc to be calculated is expressed using Expression (1) indicated below.

$$Tc = Tf + Tp + Ti + Td \quad (1)$$

In Expression (1), Tf denotes the torque of a feedforward-control component (i.e., F component) based on the vehicle speed, Tp denotes the torque of a proportional-control component (i.e., P component) based on a deviation between the vehicle speed and the target vehicle speed, Ti denotes the torque of an integral-control component (i.e., I component) based on the deviation, and Td denotes the torque of a derivative-control component (i.e., D component) based on an integrated value of the deviation. The torque Tp of the P component is obtained by multiplying the deviation by a gain. The torque Ti of the I component is obtained by multiplying the integrated value (i.e., integral value) of the deviation by a gain. The torque Td of the D component is obtained by multiplying a derivative value of the deviation by a gain. The torque Tf of the feedforward-control component corresponds to an estimated torque to be used for maintaining the vehicle speed at the target vehicle speed when the vehicle 1 is traveling on a flat road. A flat road refers to a road in which an absolute value of a gradient (i.e., an inclination in the advancing direction of the vehicle 1 relative to the horizontal direction) is smaller than or equal to a predetermined value. A downhill road to be mentioned later refers to a road other than a flat road and having a negative gradient, and an uphill road to be mentioned later refers to a road other than a flat road and having a positive gradient.

Although the following description relates to an example where the torque command value Tc for the driving motors 15 is calculated by using Expression (1), the calculation method for the torque command value Tc for the driving motors 15 is not limited to this example. The torque command value Tc for the driving motors 15 may be calculated by using at least the integral control. For example, the feedforward control may be omitted from the above example (i.e., the torque Tf may be omitted from Expression (1)), or the PID control may be replaced with proportional-integral (PI) control (i.e., the torque Td may be omitted from Expression (1)).

The function that the control device 100 according to the embodiment has may partially be distributed to a plurality of control devices, or a plurality of functions may be realized by a single control device. In a case where the function that the control device 100 has is partially distributed to a plurality of control devices, the plurality of control devices may be coupled to each other by using a communication bus, such as a controller area network (CAN).

As mentioned above, the controller 120 of the control device 100 can execute the cruise control mode in which the vehicle speed of the vehicle 1 is maintained at the target vehicle speed by controlling the torque of the driving motors 15 without being dependent on the acceleration-and-deceleration operation by the driver. If the controller 120 determines that the vehicle 1 has entered either one of a flat road and an uphill road from a downhill road or that the vehicle 1 has entered a downhill road from either one of a flat road and an uphill road during the cruise control mode, the controller 120 executes an integrated-value adjustment process involving adjusting an integrated value of a deviation between the vehicle speed and the target vehicle speed in the integral control so as to decrease an absolute value of the integrated value of the deviation. Thus, a delay in a change in the torque of the driving motors 15 relative to a change in the gradient of the road can be suppressed. Consequently, when the gradient of the road changes, a situation where the direction of the torque occurring in the vehicle 1 becomes a reverse direction to the direction of the torque used for causing the vehicle 1 to travel at the target vehicle speed can be suppressed.

Accordingly, unstable vehicle behavior caused by a change in the gradient of the road during the cruise control mode can be suppressed. The integrated-value adjustment process performed by the controller 120 during the cruise control mode will be described in detail later.

Operation of Control Device

Next, the operation of the control device 100 according to the embodiment of the disclosure will be described with reference to FIG. 3 and FIG. 4.

As described above, if it is determined that the vehicle 1 has entered either one of a flat road and an uphill road from a downhill road or that the vehicle 1 has entered a downhill road from either one of a flat road and an uphill road during the cruise control mode, the integrated-value adjustment process (i.e., the process for adjusting the integrated value of the deviation between the vehicle speed and the target vehicle speed in the integral control so as to decrease the absolute value of the integrated value of the deviation) is executed, and thus unstable vehicle behavior caused by a change in the gradient of the road is suppressed.

It is assumed that, as the target vehicle speed in the cruise control mode decreases, the vehicle travels more on a high-gradient road and the gradient is more likely to change by a large amount. Therefore, it is particularly desirable to suppress unstable vehicle behavior caused by a change in the gradient of the road in the low-speed cruise control mode, as compared with the high-speed cruise control mode. Thus, when the controller 120 determines that the vehicle 1 has entered either one of a flat road and an uphill road from a downhill road or that the vehicle 1 has entered a downhill road from either one of a flat road and an uphill road during the low-speed cruise control mode, it is desirable that the controller 120 perform the integrated-value adjustment process.

Although the following description relates to an example where the controller 120 executes the integrated-value adjustment process during the low-speed cruise control mode, the controller 120 may perform, during the high-speed cruise control mode, a process related to the integrated-value adjustment process to be described later. Alternatively, the controller 120 may be configured not to execute the integrated-value adjustment process during the high-speed cruise control mode.

Figure 3:
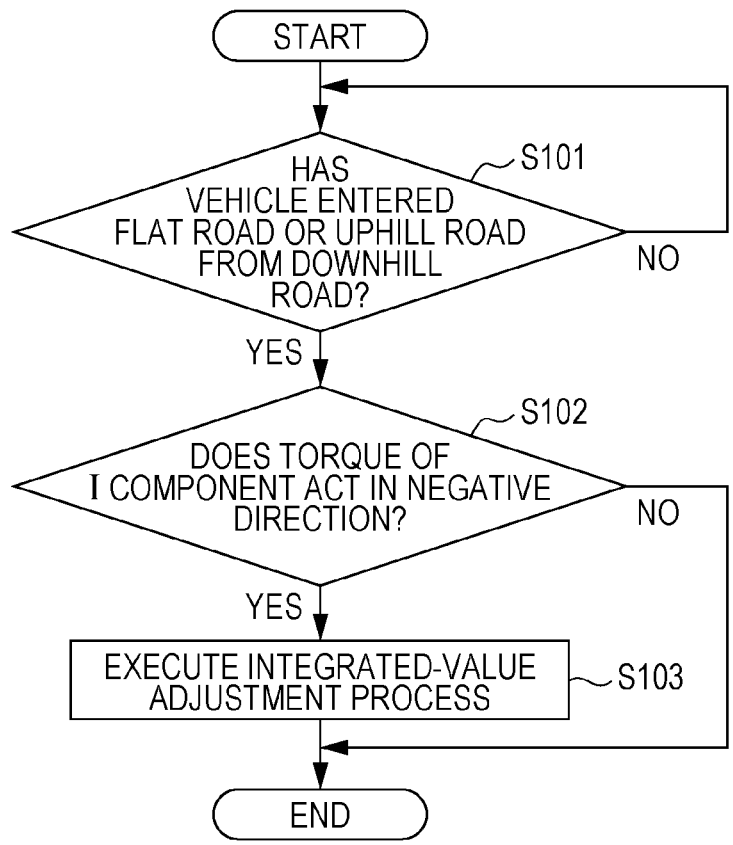
FIG. 3 is a flowchart illustrating an example of a processing flow related to an integrated-value adjustment process performed by a controller according to the embodiment of the disclosure during a low-speed cruise control mode.

FIG. 3 is a flowchart illustrating an example of a processing flow related to the integrated-value adjustment process performed by the controller 120 during the low-speed cruise control mode. In detail, the control flow illustrated in FIG. 3 is repeatedly executed during the low-speed cruise control mode.

The control flow illustrated in FIG. 3 is for executing the integrated-value adjustment process when it is determined that the vehicle 1 has entered either one of a flat road and an uphill road from a downhill road, and is executed, for example, when the vehicle 1 is traveling downhill. The process performed by the controller 120 is not limited to the example illustrated in FIG. 3. For example, as will be described later, the controller 120 may execute the integrated-value adjustment process when the controller 120 determines that the vehicle 1 has entered a downhill road from either one of a flat road and an uphill road.

FIG. 4 illustrates an example of transition of various types of state quantities in a case where the vehicle 1 enters a flat road from a downhill road during the low-speed cruise control mode. FIG. 4 illustrates the transition of various types of state quantities including the gradient of the road, the vehicle speed, the torque command value Tc, and the torque of each component of the torque command value Tc (i.e., the torque Tf of the F component, the torque Tp of the P component, and the torque Ti of the I component). A case where the vehicle speed is a positive value corresponds to a case where the vehicle 1 is moving in the advancing direction, whereas a case where the vehicle speed is a negative value corresponds to a case where the vehicle 1 is moving in the reverse direction. A positive direction of torque is the direction for moving the vehicle 1 forward, whereas a negative direction of torque is the direction for moving the vehicle 1 rearward. In FIG. 4, the torque Td of the D component in PID control is not illustrated.

The process in the control flow illustrated in FIG. 3 will be described below while referring to FIG. 4, where appropriate.

When the control flow illustrated in FIG. 3 commences, the determiner 121 first determines in step S101 whether the vehicle 1 has entered either one of a flat road and an uphill road from a downhill road. If it is determined that the vehicle 1 has entered either one of a flat road and an uphill road from a downhill road (YES in step S101), the control flow proceeds to a determination process in step S102. In contrast, if it is determined that the vehicle 1 has not entered either one of a flat road and an uphill road from a downhill road (NO in step S101), the determination process in step S101 is repeated.

For example, if the vehicle speed of the vehicle 1 falls below a first reference vehicle speed that is lower than the target vehicle speed, the determiner 121 determines that the vehicle 1 has entered either one of a flat road and an uphill road from a downhill road. When the vehicle 1 is traveling downhill, the weight of the vehicle 1 acts in the direction for accelerating the vehicle 1. Thus, when the vehicle 1 is traveling downhill, the vehicle speed is maintained at the target vehicle speed in a state where a braking force is applied to the vehicle 1 by causing the driving motors 15 to perform regenerative braking. However, when the vehicle 1 enters either one of a flat road and an uphill road from a downhill road, the weight of the vehicle 1 no longer acts in the direction for accelerating the vehicle 1, thus causing the vehicle speed to decrease. The first reference vehicle speed mentioned above is set to a speed based on which it is determinable whether the vehicle speed has decreased by an amount of decrease occurring as a result of the vehicle 1 entering either one of a flat road and an uphill road from a downhill road.

In the example illustrated in FIG. 4, the vehicle 1 is traveling on a downhill road having a negative gradient prior to a time point T1. When traveling on the downhill road, the vehicle 1 receives its own weight in the direction in which the vehicle 1 is accelerated in the advancing direction. Thus, torque is desirably applied to the vehicle 1 in the negative direction to maintain the vehicle speed at the target vehicle speed. In the example illustrated in FIG. 4, prior to the time point T1, the torque Ti of the I component is a negative value and the torque command value Tc is a negative value. Thus, a braking force according to regenerative braking can be applied to the vehicle 1 and the vehicle speed can be maintained at the target vehicle speed. At the time point T1, the gradient begins to change toward zero, and the vehicle 1 starts to enter a flat road. Thus, at the time point T1, the vehicle speed begins to decrease, causing the vehicle speed to be lower than the target vehicle speed. Accordingly, the torque Tf of the F component, the torque Tp of the P component, and the torque Ti of the I component increase from the time point T1 and onward. Then, at a time point T2 at which the vehicle 1 has completely entered the flat road, the vehicle speed falls below the first reference vehicle speed, and the determiner 121 determines that the vehicle 1 has entered either one of a flat road and an uphill road from the downhill road.

The above description relates to an example where the determination process in step S101 is performed based on the vehicle speed. Alternatively, the determination process in step S101 may be performed in accordance with another method. For example, the determiner 121 may perform the determination process in step S101 based on the gradient of the road. For example, the gradient of the road may be acquired by using a detection result of a sensor that detects the acceleration of the vehicle 1 or by using map data.

If the determination result obtained in step S101 in FIG. 3 indicates YES, the determiner 121 determines in step S102 whether the torque Ti of the I component in the torque command value Tc acts in the negative direction (i.e., the reverse direction of the vehicle 1). If it is determined that the torque Ti of the I component acts in the negative direction (YES in step S102), the control flow proceeds to step S103 where the controller 120 executes the integrated-value adjustment process, and the control flow illustrated in FIG. 3 ends. In contrast, if it is determined that the torque Ti of the I component does not act in the negative direction (NO in step S102), the control flow illustrated in FIG. 3 ends.

As mentioned above, the integrated-value adjustment process involves adjusting the integrated value of the deviation between the vehicle speed and the target vehicle speed in the integral control so as to decrease an absolute value of the integrated value of the deviation. In the integrated-value adjustment process, for example, the controller 120 resets the integrated value of the deviation between the vehicle speed and the target vehicle speed (i.e., sets the integrated value to zero). The integrated-value adjustment process performed in step S103 is for suppressing a situation where the torque occurring in the vehicle 1 acts in the negative direction after the vehicle 1 enters either one of a flat road and an uphill road.

The torque occurring in the vehicle 1 acts in the negative direction as a result of the torque Ti of the I component acting in the negative direction when the vehicle 1 enters either one of a flat road and an uphill road. Thus, if it is determined in step S102 that the torque Ti of the I component does not act in the negative direction (NO in step S102), the integrated-value adjustment process is not executed, and therefore a situation where the integrated-value adjustment process is undesirably performed can be suppressed. Consequently, a shock occurring in the vehicle 1 due to a change in the torque of the driving motors 15 occurring as a result of performing the integrated-value adjustment process can be suppressed, thereby achieving improved comfort for the driver.

In FIG. 4, the transition of the vehicle speed, the transition of the torque command value Tc, and the transition of the torque Ti of the I component in a case where the integrated-value adjustment process is supposedly not executed at the time point T2 are indicated with double-dotted chain lines. From the time point T2 and onward, the torque used for causing the vehicle 1 to travel at the target vehicle speed acts in the positive direction (i.e., the advancing direction of the vehicle 1) as the vehicle 1 enters a flat road. However, as indicated with a double-dotted chain line in FIG. 4, the torque Ti of the I component increases but changes slowly from the time point T2 and onward. Thus, the direction of the torque Ti of the I component does not quickly change to the positive direction, but a state where the torque Ti of the I component acts in the negative direction continues from the time point T2 and onward. Therefore, the direction of the torque command value Tc also does not quickly change to the positive direction, but a state where the direction of the torque command value Tc remains negative continues from the time point T2 and onward. Consequently, the vehicle speed continues to decrease from the time point T2 and onward, resulting in the vehicle speed changing from a positive value to a negative value, as indicated with a double-dotted chain line in FIG. 4. This causes the vehicle 1 to move rearward, possibly resulting in unstable vehicle behavior.

In contrast, in the embodiment, as illustrated in FIG. 4, the determiner 121 determines that the torque Ti of the I component acts in the negative direction at the time point T2, and the integrated-value adjustment process is executed. In the example illustrated in FIG. 4, the integrated value of the deviation between the vehicle speed and the target vehicle speed is reset in the integrated-value adjustment process. Consequently, the torque Ti of the I component becomes zero at the time point T2, and the integrated value of the deviation between the vehicle speed and the target vehicle speed becomes a positive value from the time point T2 and onward, and thus the torque Ti of the I component acts in the positive direction. Thus, from the time point T2 and onward, the direction of the torque command value Tc also becomes positive. As a result, a situation where the direction of the torque occurring in the vehicle 1 is a reverse direction (i.e., becomes negative) to the positive direction as the direction of the torque used for causing the vehicle 1 to travel at the target vehicle speed can be suppressed. Consequently, the vehicle speed quickly increases toward the target vehicle speed from the time point T2 and onward. Thus, a situation where the vehicle 1 moves rearward or a situation where the vehicle 1 excessively decelerates can be suppressed. Accordingly, in the embodiment, unstable vehicle behavior caused by a change in the gradient of the road can be suppressed.

In a case where the adjustment amount for the integrated value of the deviation is excessively large, a shock may occur in the vehicle 1 due to a rapid change in the torque of the driving motors 15 occurring as a result of performing the integrated-value adjustment process, which may result in reduced comfort for the driver. For suppressing such a rapid change in the torque, the controller 120 desirably limits the adjustment amount for the integrated value of the deviation to an upper limit value or smaller in the integrated-value adjustment process. For example, if the integrated value of the deviation prior to the adjustment exceeds the upper limit value, the controller 120 adjusts the integrated value of the deviation in the integrated-value adjustment process so that the absolute value for the integrated value of the deviation is not more than the upper limit value. The upper limit value is set in view of the balance between the standpoint of suppressing a rapid change in the torque of the driving motors 15 occurring as a result of performing the integrated-value adjustment process and the standpoint of suppressing unstable vehicle behavior caused by a change in the gradient of the road.

Although the integrated value of the deviation between the vehicle speed and the target vehicle speed is reset in the integrated-value adjustment process in the above-described example, the method for adjusting the integrated value of the deviation in the integrated-value adjustment process is not limited to this example. For example, the controller 120 may adjust the integrated value of the deviation to a value within a predetermined range near zero in the integrated-value adjustment process.

The above description relates to an example with reference to the flowchart in FIG. 3 where the integrated-value adjustment process is executed when it is determined that the vehicle 1 has entered either one of a flat road and an uphill road from a downhill road. Alternatively, the controller 120 may execute the integrated-value adjustment process when it is determined that the vehicle 1 has entered a downhill road from either one of a flat road and an uphill road, as mentioned above.

In detail, when the vehicle 1 is traveling on a flat road or is climbing uphill during the cruise control mode, the controller 120 determines whether the vehicle 1 has entered a downhill road from either one of the flat road and the uphill road. Then, when the controller 120 determines that the vehicle 1 has entered a downhill road from either one of the flat road and the uphill road, the controller 120 executes the integrated-value adjustment process.

While the vehicle 1 is traveling on either one of the flat road and the uphill road, the torque Ti of the I component becomes a positive value, and the torque command value Tc becomes a positive value. Thus, a driving force can be applied to the vehicle 1 and the vehicle speed can be maintained at the target vehicle speed. Then, after the vehicle 1 enters the downhill road, the torque used for causing the vehicle 1 to travel at the target vehicle speed acts in the negative direction (i.e., the reverse direction of the vehicle 1). Supposing that the integrated-value adjustment process is not executed, the torque Ti of the I component does not quickly act in the negative direction after the vehicle 1 enters the downhill road, but a state where the torque Ti of the I component acts in the positive direction continues.

Therefore, the direction of the torque command value Tc also does not quickly change to the negative direction, but a state where the direction of the torque command value Tc remains positive continues. Consequently, the vehicle speed continues to increase, resulting in excessive acceleration of the vehicle 1 and possibly resulting in unstable vehicle behavior.

In contrast, if it is determined that the vehicle 1 has entered a downhill road from either one of a flat road and an uphill road, the integrated-value adjustment process is executed so that, for example, the integrated value of the deviation between the vehicle speed and the target vehicle speed is reset, whereby the direction of the torque Ti of the I component can be quickly changed from the positive direction to the negative direction after the vehicle 1 enters the downhill road. Thus, the direction of the torque command value Tc can also be quickly changed from the positive direction to the negative direction. As a result, a situation where the direction of the torque occurring in the vehicle 1 becomes a reverse direction (i.e., becomes positive) to the negative direction as the direction of the torque used for causing the vehicle 1 to travel at the target vehicle speed can be suppressed. Consequently, excessive acceleration of the vehicle 1 can be suppressed.

For example, if the vehicle speed of the vehicle 1 exceeds a second reference vehicle speed that is higher than the target vehicle speed, the controller 120 determines that the vehicle 1 has entered a downhill road from either one of a flat road and an uphill road. When the vehicle 1 is traveling on either one of a flat road and an uphill road, the weight of the vehicle 1 does not act in the direction for accelerating the vehicle 1. Thus, when the vehicle 1 is traveling on either one of a flat road and an uphill road, the vehicle speed is maintained at the target vehicle speed in a state where a driving force is applied to the vehicle 1 by actuating the driving motors 15. However, when the vehicle 1 enters a downhill road from either one of a flat road and an uphill road, the weight of the vehicle 1 acts in the direction for accelerating the vehicle 1, thus causing the vehicle speed to increase. The second reference vehicle speed mentioned above is set to a speed based on which it is determinable whether the vehicle speed has increased by an amount of increase occurring as a result of the vehicle 1 entering a downhill road from either one of a flat road and an uphill road.

Furthermore, when the controller 120 determines that the vehicle 1 has entered a downhill road from either one of a flat road and an uphill road, the controller 120 desirably executes the integrated-value adjustment process if the torque Ti of the I component acts in the positive direction (i.e., the advancing direction of the vehicle 1). The integrated-value adjustment process in this case is for suppressing a situation where the torque occurring in the vehicle 1 acts in the positive direction after the vehicle 1 enters the downhill road. The torque occurring in the vehicle 1 acts in the positive direction as a result of the torque Ti of the I component acting in the positive direction when the vehicle 1 enters the downhill road. Thus, if the integrated-value adjustment process is not executed when it is determined that the torque Ti of the I component does not act in the positive direction, a situation where the integrated-value adjustment process is undesirably performed can be suppressed. Consequently, a shock occurring in the vehicle 1 due to a change in the torque of the driving motors 15 occurring as a result of performing the integrated-value adjustment process can be suppressed, thereby achieving improved comfort for the driver.

Advantages of Control Device

Next, the advantages of the control device 100 according to the embodiment of the disclosure will be described.

In the control device 100 according to the embodiment, when the controller 120 determines that the vehicle 1 has entered either one of a flat road and an uphill road from a downhill road or that the vehicle 1 has entered a downhill road from either one of a flat road and an uphill road during the cruise control mode, the controller 120 executes the integrated-value adjustment process involving adjusting the integrated value of the deviation between the vehicle speed and the target vehicle speed in the integral control so as to decrease an absolute value of the integrated value of the deviation. Thus, a delay in a change in the torque of the driving motors 15 relative to a change in the gradient of the road can be suppressed. Consequently, when the gradient of the road changes, a situation where the direction of the torque occurring in the vehicle 1 becomes a reverse direction to the direction of the torque used for causing the vehicle 1 to travel at the target vehicle speed can be suppressed. Accordingly, unstable vehicle behavior caused by a change in the gradient of the road during the cruise control mode can be suppressed.

Furthermore, in the control device 100 according to the embodiment, when the vehicle speed of the vehicle 1 falls below the first reference vehicle speed that is lower than the target vehicle speed during the cruise control mode, the controller 120 desirably determines that the vehicle 1 has entered either one of a flat road and an uphill road from a downhill road. Accordingly, it can be appropriately determined whether the vehicle 1 has entered either one of a flat road and an uphill road from a downhill road. Thus, when the vehicle 1 enters either one of a flat road and an uphill road from a downhill road, the integrated-value adjustment process can be appropriately executed. Therefore, in this case, a situation where the torque occurring in the vehicle 1 acts in the negative direction (i.e., the reverse direction of the vehicle 1) can be appropriately suppressed, and thus a situation where the vehicle 1 moves rearward or a situation where the vehicle 1 excessively decelerates can be suppressed.

Furthermore, in the control device 100 according to the embodiment, when the controller 120 determines that the vehicle 1 has entered either one of a flat road and an uphill road from a downhill road during the cruise control mode, the controller 120 desirably executes the integrated-value adjustment process if the torque Ti of the I component in the torque command value Tc acts in the negative direction (i.e., the reverse direction of the vehicle 1). Thus, a situation where the integrated-value adjustment process is undesirably performed can be suppressed. Consequently, a shock occurring in the vehicle 1 due to a change in the torque of the driving motors 15 occurring as a result of performing the integrated-value adjustment process can be suppressed, thereby achieving improved comfort for the driver.

Furthermore, in the control device 100 according to the embodiment, if the vehicle speed of the vehicle 1 exceeds the second reference vehicle speed that is higher than the target vehicle speed during the cruise control mode, the controller 120 desirably determines that the vehicle 1 has entered a downhill road from either one of a flat road and an uphill road. Accordingly, it can be appropriately determined whether the vehicle 1 has entered a downhill road from either one of a flat road and an uphill road. Thus, when the vehicle 1 enters a downhill road from either one of a flat road and an uphill road, the integrated-value adjustment process can be appropriately executed. Consequently, a situation where the torque occurring in the vehicle 1 acts in the positive direction (i.e., the advancing direction of the vehicle 1) can be appropriately suppressed, and thus excessive acceleration of the vehicle 1 can be appropriately suppressed.

Furthermore, in the control device 100 according to the embodiment, when the controller 120 determines that the vehicle 1 has entered a downhill road from either one of a flat road and an uphill road during the cruise control mode, the controller 120 desirably executes the integrated-value adjustment process if the torque Ti of the I component in the torque command value Tc acts in the positive direction (i.e., the advancing direction of the vehicle 1). Thus, a situation where the integrated-value adjustment process is undesirably performed can be suppressed. Consequently, a shock occurring in the vehicle 1 due to a change in the torque of the driving motors 15 occurring as a result of performing the integrated-value adjustment process can be suppressed, thereby achieving improved comfort for the driver.

Furthermore, in the control device 100 according to the embodiment, the controller 120 desirably resets the integrated value of the deviation between the vehicle speed and the target vehicle speed in the integrated-value adjustment process. Thus, a delay in a change in the torque of the driving motors 15 relative to a change in the gradient of the road can be effectively suppressed. Consequently, when the gradient of the road changes, a situation where the direction of the torque occurring in the vehicle 1 becomes a reverse direction to the direction of the torque used for causing the vehicle 1 to travel at the target vehicle speed can be effectively suppressed. Accordingly, unstable vehicle behavior caused by a change in the gradient of the road during the cruise control mode can be effectively suppressed.

Furthermore, in the control device 100 according to the embodiment, the controller 120 desirably limits the adjustment amount for the integrated value of the deviation between the vehicle speed and the target vehicle speed to the upper limit value or smaller in the integrated-value adjustment process.

Accordingly, a situation where the torque of the driving motors 15 rapidly changes as a result of performing the integrated-value adjustment process due to an excessively large adjustment amount for the integrated value of the deviation can be suppressed. Consequently, reduction in comfort for the driver caused by a shock occurring in the vehicle 1 due to the integrated-value adjustment process can be suppressed.

Furthermore, in the control device 100 according to the embodiment, when the controller 120 determines that the vehicle 1 has entered either one of a flat road and an uphill road from a downhill road or that the vehicle 1 has entered a downhill road from either one of a flat road and an uphill road during the low-speed cruise control mode, the controller 120 desirably executes the integrated-value adjustment process. As mentioned above, since the target vehicle speed in the low-speed cruise control mode is lower than that in the high-speed cruise control mode, it is particularly desirable to suppress unstable vehicle behavior caused by a change in the gradient of the road. Thus, when it is determined that the vehicle 1 has entered either one of a flat road and an uphill road from a downhill road or that the vehicle 1 has entered a downhill road from either one of a flat road and an uphill road during the low-speed cruise control mode, the integrated-value adjustment process is executed, and accordingly the effect of suppressing unstable vehicle behavior caused by a change in the gradient of the road during the cruise control mode can be effectively utilized.

Although the embodiment of the disclosure has been described above with reference to the appended drawings, the disclosure is not limited to the above embodiment. Needless to say, various modifications and alterations within the scope defined in the claims are included in the technical scope of the disclosure.

For example, although the vehicle 1 described above is an electric vehicle equipped with the front-wheel driving motor 15f and the rear-wheel driving motor 15r as driving sources, the configuration of the vehicle equipped with the control device according to the embodiment of the disclosure is not particularly limited to the vehicle 1. For example, the vehicle equipped with the control device according to the embodiment of the disclosure may be an electric vehicle provided with different driving motors (i.e., four driving motors) for the individual wheels, or may be a hybrid vehicle equipped with a driving motor and an engine as driving sources. Furthermore, for example, the vehicle equipped with the control device according to the embodiment of the disclosure may be a vehicle obtained by adding a component to, changing a component in, or deleting a component from the vehicle 1 described with reference to FIG. 1.

Furthermore, for example, the process described with reference to the flowchart in this description may be executed in a sequence different from that indicated in the flowchart. Moreover, an additional step may be used, or one or more steps may be omitted.

The control device 100 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control device 100 including the identifier 110 and the controller 120. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A vehicle control device comprising:
   a controller configured to control operation of a driving motor that is to output a driving force for a vehicle to travel at a target vehicle speed,
   wherein the controller is capable of executing a normal mode and a cruise control mode that are switchable, the normal mode being a mode in which acceleration and deceleration of the vehicle are controlled in accordance with an acceleration-and-deceleration operation by a driver, the cruise control mode being a mode in which a vehicle speed of the vehicle is maintained at the target vehicle speed by controlling torque of the driving motor without being dependent on the acceleration-and-deceleration operation by the driver, and
   wherein the controller is configured to, during the cruise control mode, calculate a torque command value for the driving motor for the vehicle to travel by using integral control based on an integral value of a deviation between the vehicle speed and the target vehicle speed, and execute an integrated-value adjustment process when the controller determines that the vehicle has entered either one of a flat road and an uphill road from a downhill road or that the vehicle has entered a downhill road from either one of a flat road and an uphill road, the integrated-value adjustment process comprising adjusting the integral value of the deviation to reduce an absolute value of the integral value of the deviation in the integral control, the torque command value controls the torque of the driving motor, wherein the controller is configured to reset the integral value to a predetermined value of the deviation in the integrated-value adjustment process when the controller has determined that the vehicle has entered either one of the flat road and the uphill road from the downhill road or that the vehicle has entered the downhill road from either one of the flat road and the uphill road.

2. The vehicle control device according to claim 1, wherein the controller is configured to determine that the vehicle has entered either one of a flat road and an uphill road from a downhill road when the vehicle speed falls below a first reference vehicle speed that is lower than the target vehicle speed during the cruise control mode.

3. The vehicle control device according to claim 1, wherein, the controller is configured to execute the integrated-value adjustment process when the controller determines that the vehicle has entered either one of a flat road and an uphill road from a downhill road during the cruise control mode and torque of a component of the integral control in the torque command value acts in a reverse direction of the vehicle.

4. The vehicle control device according to claim 2, wherein, the controller is configured to execute the integrated-value adjustment process when the controller determines that the vehicle has entered either one of a flat road and an uphill road from a downhill road during the cruise control mode and torque of a component of the integral control in the torque command value acts in a reverse direction of the vehicle.

5. The vehicle control device according to claim 1, wherein the controller is configured to determine that the vehicle has entered a downhill road from either one of a flat road and an uphill road when the vehicle speed exceeds a second reference vehicle speed that is higher than the target vehicle speed during the cruise control mode.

6. The vehicle control device according to claim 2, wherein the controller is configured to determine that the vehicle has entered a downhill road from either one of a flat road and an uphill road when the vehicle speed exceeds a second reference vehicle speed that is higher than the target vehicle speed during the cruise control mode.

7. The vehicle control device according to claim 1, wherein, the controller is configured to execute the integrated-value adjustment process when the controller determines that the vehicle has entered a downhill road from either one of a flat road and an uphill road during the cruise control mode and torque of a component of the integral control in the torque command value acts in an advancing direction of the vehicle.

8. The vehicle control device according to claim 2, wherein, the controller is configured to execute the integrated-value adjustment process when the controller determines that the vehicle has entered a downhill road from either one of a flat road and an uphill road during the cruise control mode and torque of a component of the integral control in the torque command value acts in an advancing direction of the vehicle.

9. The vehicle control device according to claim 1, wherein the controller is configured to reset the integral value of the deviation in the integrated-value adjustment process to a zero value or a substantially zero value.

10. The vehicle control device according to claim 2, wherein the controller is configured to reset the integral value of the deviation in the integrated-value adjustment process to a zero value or a substantially zero value.

11. The vehicle control device according to claim 1, wherein the controller is configured to limit an adjustment amount for the integral value of the deviation to an upper limit value or smaller in the integrated-value adjustment process.

12. The vehicle control device according to claim 2, wherein the controller is configured to limit an adjustment amount for the integral value of the deviation to an upper limit value or smaller in the integrated-value adjustment process.

13. The vehicle control device according to claim 1, wherein the cruise control mode comprises a high-speed cruise control mode and a low-speed cruise control mode that are switchable and executable by the controller, the low-speed cruise control mode being a mode in which a target vehicle speed used is lower than a target vehicle speed in the high-speed cruise control mode, and wherein the controller is configured to execute the integrated-value adjustment process when the controller determines that the vehicle has entered either one of a flat road and an uphill road from a downhill road or that the vehicle has entered a downhill road from either one of a flat road and an uphill road during the low-speed cruise control mode.

14. The vehicle control device according to claim 2, wherein the cruise control mode comprises a high-speed cruise control mode and a low-speed cruise control mode that are switchable and executable by the controller, the low-speed cruise control mode being a mode in which a target vehicle speed used is lower than a target vehicle speed in the high-speed cruise control mode, and wherein the controller is configured to execute the integrated-value adjustment process when the controller determines that the vehicle has entered either one of a flat road and an uphill road from a downhill road or that the vehicle has entered a downhill road from either one of a flat road and an uphill road during the low-speed cruise control mode.

15. A vehicle control device comprising:

circuitry configured to control operation of a driving motor that is to output a driving force for a vehicle to travel at a target vehicle speed, and execute a normal mode and a cruise control mode that are switchable, the normal mode being a mode in which acceleration and deceleration of the vehicle are controlled in accordance with an acceleration-and-deceleration operation by a driver, the cruise control mode being a mode in which a vehicle speed of the vehicle is maintained at the target vehicle speed by controlling torque of the driving motor without being dependent on the acceleration-and-deceleration operation by the driver, wherein, during the cruise control mode, the circuitry configured to calculate a torque command value for the driving motor by using integral control based on an integral value of a deviation between the vehicle speed and the target vehicle speed, and execute an integrated-value adjustment process when the circuitry determines that the vehicle has entered either one of a flat road and an uphill road from a downhill road or that the vehicle has entered a downhill road from either one of a flat road and an uphill road during the cruise control mode, the integrated-value adjustment process comprising adjusting the integral value of the deviation to reduce an absolute value of the integral value of the deviation in the integral control, the torque command value controls the torque of the driving motor, wherein the circuitry is configured to reset the integral value to a predetermined value of the deviation in the integrated-value adjustment process when the circuitry has determined that the vehicle has entered either one of the flat road and the uphill road from the downhill road or that the vehicle has entered the downhill road from either one of the flat road and the uphill road.

16. The vehicle control device according to claim 15, wherein the circuitry is configured to determine that the vehicle has entered either one of a flat road and an uphill road from a downhill road when the vehicle speed falls below a first reference vehicle speed that is lower than the target vehicle speed during the cruise control mode, and wherein the predetermined value is zero or substantially zero.

17. The vehicle control device according to claim 15, wherein, the circuitry is configured to execute the integrated-value adjustment process when the controller determines that the vehicle has entered either one of a flat road and an uphill road from a downhill road during the cruise control mode and torque of a component of the integral control in the torque command value acts in a reverse direction of the vehicle.

18. The vehicle control device according to claim 15, wherein the circuitry is configured to determine that the vehicle has entered a downhill road from either one of a flat road and an uphill road when the vehicle speed exceeds a second reference vehicle speed that is higher than the target vehicle speed during the cruise control mode.

19. A program for a vehicle control device stored in a non-transitory computer readable medium and executable by a processor, the computer program comprising:

controlling operation of a driving motor that is to output a driving force for a vehicle to travel at a target vehicle speed;

executing a normal mode and a cruise control mode that are switchable, the normal mode being a mode in which acceleration and deceleration of the vehicle are controlled in accordance with an acceleration-and-deceleration operation by a driver, the cruise control mode being a mode in which a vehicle speed of the vehicle is maintained at the target vehicle speed by controlling torque of the driving motor without being dependent on the acceleration-and-deceleration operation by the driver; and during the cruise control mode, calculating a torque command value for the driving motor by using integral control based on an integral value of a deviation between the vehicle speed and the target vehicle speed, and executing an integrated-value adjustment process when the controller determines that the vehicle has entered either one of a flat road and an uphill road from a downhill road or that the vehicle has entered a downhill road from either one of a flat road and an uphill road, the integrated-value adjustment process comprising adjusting the integral value of the deviation to reduce an absolute value of the integral value of the deviation in the integral control, the torque command value controls the torque of the driving motor, wherein the integral value is reset to a predetermined value of the deviation in the integrated-value adjustment process when the controller has determined that the vehicle has entered either one of the flat road and the uphill road from the downhill road or that the vehicle has entered the downhill road from either one of the flat road and the uphill road.

20. The program according to claim 19, further comprising determining that the vehicle has entered either one of a flat road and an uphill road from a downhill road when the vehicle speed falls below a first reference vehicle speed that is lower than the target vehicle speed during the cruise control mode, and wherein the predetermined value is zero or substantially zero.

* * * * *